US005689717A

United States Patent [19]
Pritt

[11] Patent Number: 5,689,717
[45] Date of Patent: Nov. 18, 1997

[54] METHOD AND APPARATUS FOR THE PLACEMENT OF ANNOTATIONS ON A DISPLAY WITHOUT OVERLAP

[75] Inventor: Mark D. Pritt, Walkersville, Md.

[73] Assignee: Lockheed Martin Corporation, Bethesda, Md.

[21] Appl. No.: 598,094

[22] Filed: Feb. 7, 1996

Related U.S. Application Data

[63] Continuation of Ser. No. 162,415, Dec. 3, 1993, abandoned.

[51] Int. Cl.$^6$ .................................................. G06T 13/00
[52] U.S. Cl. ........................... 395/773; 395/133; 395/779; 395/788
[58] Field of Search ................................ 395/133, 146, 395/155, 156, 157, 159, 160, 773, 343, 348, 349, 350, 779, 782, 783, 788, 174, 336; 364/443, 460; 340/988, 995; 382/180, 296

[56] References Cited

U.S. PATENT DOCUMENTS

| | | | |
|---|---|---|---|
| 4,539,653 | 9/1985 | Bartlett et al. | 395/148 |
| 5,010,406 | 4/1991 | Kawakami et al. | 348/468 |
| 5,146,552 | 9/1992 | Cassorla et al. | 395/145 |
| 5,204,946 | 4/1993 | Shimamura | 395/146 |
| 5,261,044 | 11/1993 | Dev et al. | 395/159 |
| 5,287,448 | 2/1994 | Nicol et al. | 395/159 |
| 5,295,244 | 3/1994 | Dev et al. | 395/161 |
| 5,297,249 | 3/1994 | Bernstein et al. | 395/156 |
| 5,363,482 | 11/1994 | Victor et al. | 395/157 |

OTHER PUBLICATIONS

Zoraster, "The Solution of Large 0–1 Integer Programming Problem Encountered in Automated Cartography," *Operation Research*, vol. 38, No. 5, 1990, pp. 752–759.

J. W. van Roessel, "An Algorithm for Locating Candidate Labeling Boxes Within a Polygon," The American Cartographer, vol. 16, No. 3, 1989, pp. 201–209.

S. Zoraster, "The Solution of Large 0–1 Integer Programming Problems Encountered in Automated Cartography," Operations Research, vol. 38, No. 5, 1990, pp. 752–759.

E. Beck, et al., "Format Implications and Propagation Resulting From Annotation Text Placement," IBM Technical Disclosure Bulletin, pp. 2872–2878.

J. Ransom, et al., "Multiple References to Non–Text Objects," IBM Technical Disclosure Bulletin, pp. 444–447, vol. 30, No. 7, Dec. 1987.

V. Cuan, et al., "Method to Establish the Origin Point for Non–Text Objects," IBM Technical Disclosure Bulletin, pp. 351–352, vol. 30, No. 7, Dec. 1987.

R. Pascoe, "Variable Object Space in Mixed Object Document Content Architecture," IBM Technical Disclosure Bulletin, pp. 903–909, vol. 30, No. 2, Jul. 1987.

J. Bridges, et al., "Placing Text for Presentations Employing Relative–Position Macros," IBM Technical Disclosure Bulletin, pp. 1988–1989, vol. 27, No. 4A, Sep. 1984.

B. Barker, et al., "Method for Creating Annotation Date," IBM Technical Disclosure Bulletin, vol. 28, No. 4, Sep. 1985, pp. 1623–1628.

Cook, A.C., et al. 'A Prolog rule–based system for cartographic name placement' * p. 110, paragraph 2; fig 1 * Computer Graphics Forum, Jun. 1990, Netherlands, vol. 9, No. 2, ISSN 0167–7055, pp. 109–126.

Freeman, et al. 'on the problem of placing names in a geographic map' * p. 132, paragraph 5; figure 8 * Internaational Journal Of Pattern Recognition And Artificial Intelligence, vol. 1, No. 1, Apr. 1987, pp. 121–140.

Jones, C.B. 'Conflict resolution in cartographic name placement' * p. 178, left column *, Computer Aided Design, Apr. 1990, Uk, vol. 22, No. 3, ISSN 0010–4485, pp. 173–183.

Jones, C.B. 'Cartographic name placement with Prolog' * paragraph: "Searching for free space and avoiding overlap" *, IEEE Computer Graphics And Applications, Sep. 1989, USA, vol. 9, No. 5, ISSN 0272–1716 pp. 36–47.

Doerschler, J.S., et al 'A Rule–Based' * p. 75, right column *, Communications Of The Association For Computing Machinery, vol. 35, No. 1, 1 Jan. 1992.

*Primary Examiner*—Mark K. Zimmerman
*Assistant Examiner*—Stephen Hong
*Attorney, Agent, or Firm*—John D. Flynn; Peter E. Rosden; Mark A. Wurm

[57] ABSTRACT

A method and system for placing annotations of various sizes on a display without overlapping the annotations is described. Each annotation is represented by its rectangular bounding box along with an identifying line or arrow that joins the rectangle with the display object that is to be annotated. These rectangles and lines are stored in a list. When an additional annotation is to be placed on the display, it is tested at various positions to determine if there is overlap with the annotations that are already on the display. The tested positions are chosen by varying the length of the identifying line and the angle it forms with the horizontal. When a position is found that yields no overlap, the annotation is placed on the display and added to the list of positioned annotations. This approach is very fast due to the simplicity of the overlap tests, which consist of simple geometric operations. The approach is also fast because it can do a quick search first followed by a more exhaustive search if no suitable position is found. It also can be modified easily to place the annotations without crowding them too closely together.

22 Claims, 7 Drawing Sheets

| UNIQUE IDENTIFIC_ 201 | TEXT 203 | TEXT DIMENSIONS 205 | TEXT LOCATION 207 | IDENTIFY LINE 209 |
|---|---|---|---|---|
| 1 | TEXT | TEXT DIMENSIONS (w,h) | TEXT LOCATION (i,j) | IDENTIFYING LINE (m,n) TO (i,j) |
| 2 | TEXT | TEXT DIMENSIONS (w,h) | TEXT LOCATION (i,j) | IDENTIFYING LINE (m,n) TO (i,j) |
| 3 | TEXT | TEXT DIMENSIONS (w,h) | TEXT LOCATION (i,j) | IDENTIFYING LINE (m,n) TO (i,j) |
| 4 | TEXT | TEXT DIMENSIONS (w,h) | TEXT LOCATION (i,j) | IDENTIFYING LINE (m,n) TO (i,j) |

METHOD AND APPARATUS FOR THE PLACEMENT OF ANNOTATIONS ON A DISPLAY WITHOUT OVERLAP

This Application is a Continuation of application Ser. No. 08/162,415, filed Dec. 3, 1993, now abandoned.

BACKGROUND OF THE INVENTION

1. Field of the Invention

The present invention relates to a system and method for the placement of annotations on a computer display. More specifically, the present invention relates to the automated placement of annotations of various sizes without overlapping currently displayed annotations.

2. Description of the Prior Art

Many computer systems are developed today to aid an operator or user in performing or directing certain tasks with respect to displayed objects. These computer systems provide the user with information concerning the displayed objects. Information concerning the displayed objects is provided via text that describes the current state or other attributes of the displayed object. The displayed objects may be aircraft, helicopters, ships, tanks, trucks, trains, buses, cars, machines, processes, stars, celestial objects, planets, dinosaurs, animals, insects, etc. Typically, these objects are represented symbolically in a computer system and displayed on a computer display. Many computer systems require the placement of annotations, where the annotations consist of blocks of text which may have various sizes, on a display without overlapping or crowding the text. For example, air traffic control displays show airplane icons with identifying text beside each icon. These text blocks have various sizes that depend on how much information is displayed for each icon. Star map displays show maps of the sky with identifying text beside certain stars and celestial objects. Other examples include computer games, graphical status displays and graphics programs that allow a user to identify graphical objects with a mouse or other pointing device.

Objects are typically represented on a computer display using some type of symbol or icon. Information concerning these objects is conveyed via the position of the object on the display and possibly text associated with the symbol. Since all information concerning a particular object cannot be displayed on the display, most systems typically provide the user with the ability to select a particular object and view more detailed information. Since such systems typically display a large number of objects at one time, they usually require the user to perform additional acts to obtain additional information. For example, selecting the object with an input device or moving a cursor on top of the object as displayed and selecting enter. Upon selection of an object, additional information is presented about the selected object. The user may also be required to make another selection to remove the additional information from the display. Most users require information on several objects to be displayed simultaneously. That is, information on more than one object is required at any given time. Even with systems that require user selection to display annotations, previous annotations may be partially or totally obscured by other selections.

A common method for placing annotations or text blocks or additional information on a display is to have the application developer specify where they are to be placed with respect to the display object. Typically this results in a fixed orientation of the annotation with respect to the display objects. Whether or not annotations are obscured or covered by other annotations depends entirely on the location of the display objects and their order of selection. This technique has several significant drawbacks in that important information may be overlapped. It also requires the application developer to select a suitable orientation when little or no information on the spatial relationships of the objects on the display is known. Also at the time the application developer decides on an orientation, little or no information may be known on the size of the annotations. This is further complicated by some systems where the displayed objects are dynamic (i.e., where the display position of the objects change over time).

Another common method for placing text blocks on a display divides the display by means of a grid into blocks of a fixed size. When a text block must be placed on the screen, it is placed in one of the grid blocks. However, this method can only be applied when all of the text blocks are the same size. Since many of the examples cited above require the placement of text blocks of different sizes, this method cannot be used.

There is a need in the art for a method to place annotations of various sizes on a computer display without overlap.

SUMMARY OF THE INVENTION

The above-mentioned long-felt need has been met in accordance with the present invention by providing means for the automated placement of annotations of various sizes on a display. The invention is designed for implementation on a personal computer (PC), workstation, notebook computer, personal digital assistant (PDA) or other computer system.

It is an object of the invention to place the annotations without overlap.

It is an object of the invention to place the annotations without crowding.

It is an object of the invention to place the annotations without overlap and crowding.

It is another object of the invention to determine the positions of the annotations on the display very quickly.

It is a further object to "squeeze" an annotation between previously placed annotations with a minimal amount of overlap when overlap cannot be avoided.

It is yet another object to place, in addition to text blocks, annotations such as icons, pixmaps and graphical structures that have a rectangular shape or that can be bounded by a rectangular box.

It is still another object to place with the annotation a symbol such as an arrow or line for associating the annotation with the display object to be annotated.

In accordance with a preferred embodiment of the present invention, a system for placing annotations on the display comprises a means for storing the annotations along with their dimensions and display positions in a list. The system also includes means for determining whether or not two annotations overlap on the display. Lastly, the system includes means for displaying annotations on a display or portion of the display.

According to the invention, the foregoing objects are achieved as follows. Assume, each annotation is represented by a rectangle with an identifying line, arrow or other symbol connecting the rectangle with the object being identified. The annotations that already have been placed on the display are stored in a list. Each element of the list stores the display location and the dimensions (width and height) of an annotation. Each element of the list may also store the endpoint of the identifying arrow or line or other symbol that joins the rectangle to the identified object. Given this list of annotations, and given the display position of a new object to be identified along with the dimensions of its annotation, the location of the additional annotation is determined as follows. A small line length is selected for the identifying line, and the position of the rectangle is tentatively placed at the 3 o'clock position. It is easily determined whether or not this rectangle overlaps the other text blocks in the list by means of geometric operations that determine whether or not two rectangles or their identifying lines overlap. If there is no overlap with all of the other text blocks, the additional text block is added to the list and displayed. Otherwise, the rectangular bounding box of the additional text block is tentatively placed at the 4 o'clock position. This process is repeated until a position for the additional text block that results in no overlap is found. All positions can be tested and the position that is farthest from the existing text blocks can be selected to avoid crowding. If no position is found that avoids overlap then the length of the identifying arrow is increased and the process is repeated.

BRIEF DESCRIPTION OF THE DRAWINGS

The foregoing and other objects, aspects and advantages of the invention will be better understood from the following detailed description with reference to the drawings, in which.

OVERVIEW

Figure 6:
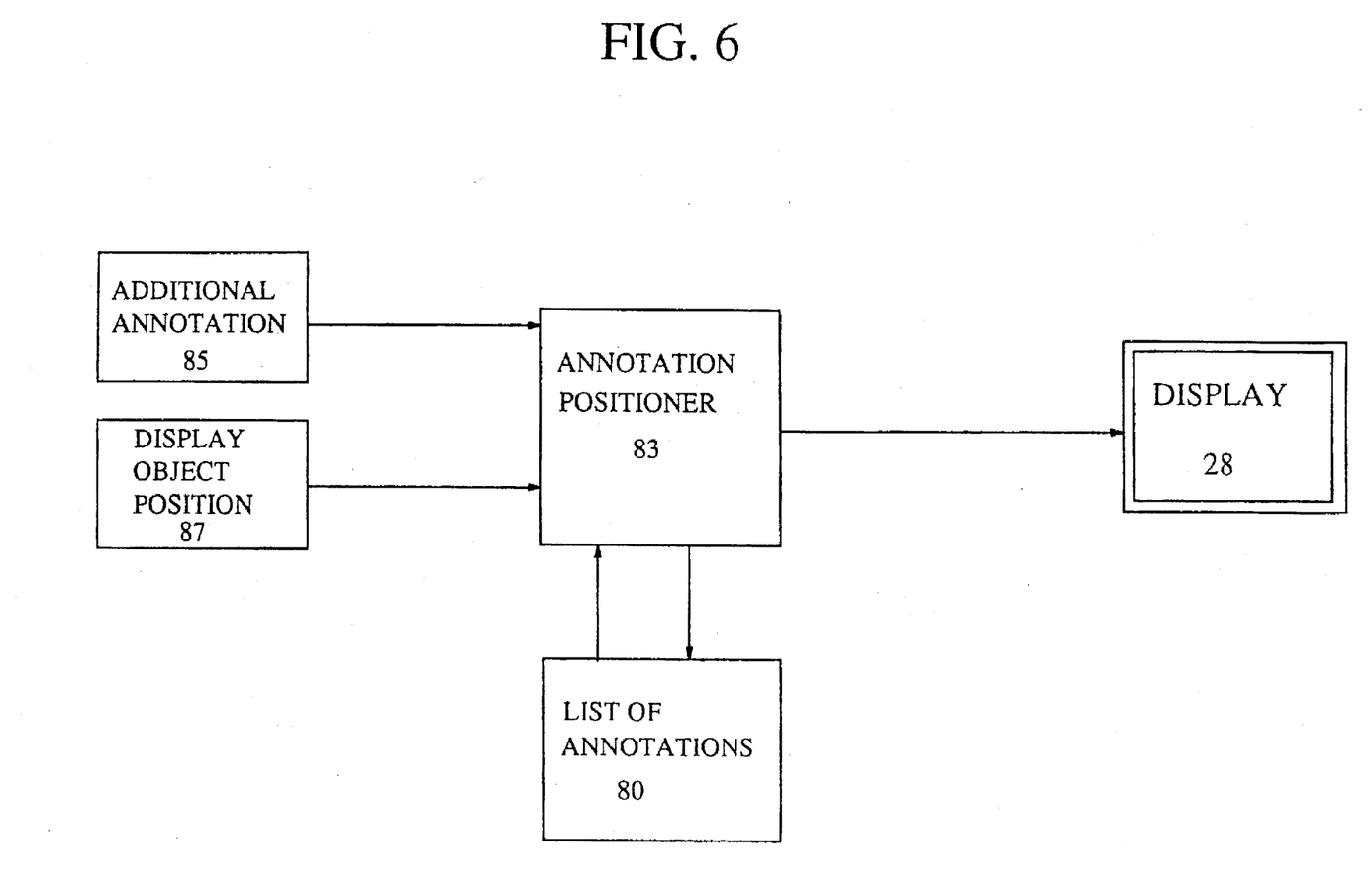
FIG. 6 is a functional overview of the present invention.

An overview of the present invention is provided in FIG. 6. The preferred embodiment of the present invention comprises one or more software systems. In this context, a software system is a collection of one or more executable software programs, and one or more storage areas, for example, RAM or disk. In general terms, a software system should be understood to comprise a fully functional software embodiment of a function or collection of functions, which can be added to an existing computer system to provide new function to that computer system. Software systems generally are constructed in a layered fashion. In a layered system, a lowest level software system is usually the computer operating system which enables the hardware to execute software instructions. Additional layers of software systems may provide, for example, database or graphical user interface or window management system capabilities. These software systems provide a foundation on which additional software systems can be built.

A software system is thus understood to be a software implementation of a function which can be assembled in a computer system providing new functionality. Also, in general, the interface provided by one software system to another software system is well-defined. It should be understood in the context of the present invention that delineations between software systems are representative of the preferred implementation. However, the present invention may be implemented using any combination or separation of software systems.

As shown in FIG. 6 the present invention consists of a display 28 where a user is presented with visual information, a list of existing placed annotations 80, an additional annotation 85, a display object position 87 and an annotation positioner 83. The additional annotation 85 is associated with a display object and the display object position 87 provides the display position of the display object. The list of annotations 80 contains information or pointers to information on annotations currently shown on the display or in the display coordinate system. A list of annotations 80 that have been placed on the display are provided to the annotation positioner 83 along with an additional annotation 85 and the display object position 87 of the display object to be annotated so that the annotation positioner 83 can determine the display position of the additional annotation such that it does not overlap currently displayed annotations 80 on the display. The annotation positioner 83 determines a suitable place for the additional annotation given the positions and sizes of the other annotations on the display (from the list 80) and the display object position 87 so that the additional annotation does not overlap any of the annotations in the list 80 currently displayed.

DETAILED DESCRIPTION OF THE INVENTION

A functional overview of the present invention is shown in FIG. 6. The present invention can be implemented with a variety of hardware and software systems. For purposes of illustration, the invention is described with respect to an implementation using the C language, on an IBM RISC System/6000® workstation running AIX® and AIX X-Windows with the OSF/Motif® toolkit. The principles of this invention are not limited to this particular implementation.

Figure 1:
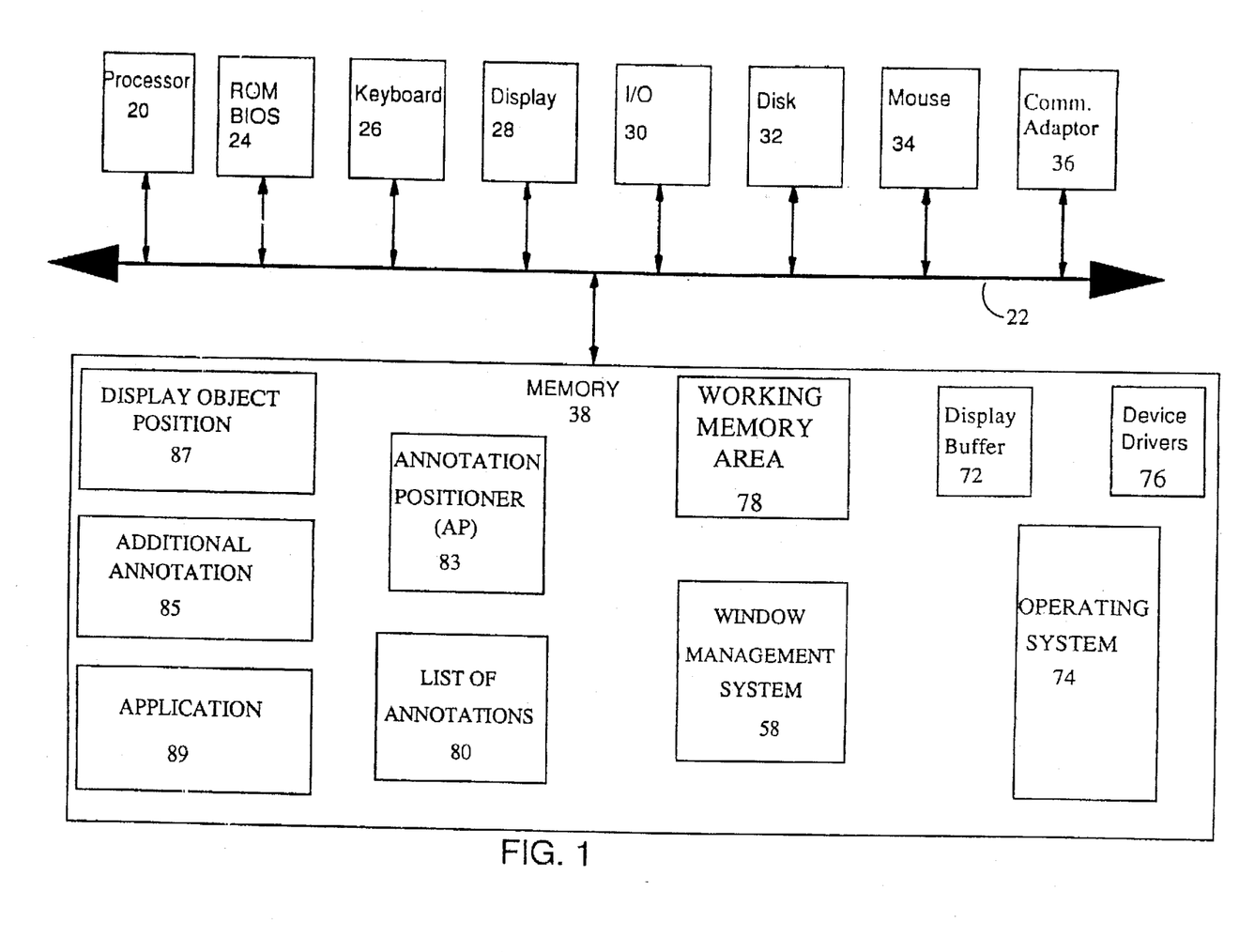
FIG. 1 is a block diagram of the preferred embodiment for a system that places annotations on a display without overlap.

The preferred embodiment of this invention comprises a set of software systems for the placement of annotations without overlap on a display as shown in the architectural block diagram of FIG. 1. Each annotation is associated with a display object. Each annotation is represented by a rectangle with an identifying line, arrow or other symbol connecting the rectangle with the object being identified. The rectangle may contain a text block, icon, pixmap, or any other graphical structure or combination of structures that have a rectangular shape or that can be bounded by a rectangular box. Annotations consisting of a text block and a line connecting the text block to the associated display object will be used to describe the present invention. FIG. 1 includes a processor 20 connected by means of a system bus 22 to a read only memory (ROM) 24 and memory 38. Memory 38 may consist of any of the following in combination or alone: disk, flash memory, random access memory or read only memory or any other memory technology. Also included in the computer system in FIG. 1 are a display 28 by which the computer presents information to the user, and input devices including a keyboard 26, mouse 34 and other devices that may be attached via input/output port 30. Other input devices such as other pointing devices or voice sensors or image sensors may also be attached. Other pointing devices include tablets, numeric keypads, touch screens, touch screen overlays, track balls, joy sticks, light pens, thumb wheels, etc. The I/O 30 can be connected to communication lines, disk storage, input devices, output devices, other I/O equipment or other computer systems. The memory 38 contains a display buffer 72 that contains pixel intensity values for a display. The display 28 periodically reads the pixel values for the display buffer 72, displaying these values onto a display screen.

The memory 38 contains a list of annotations 80 currently displayed on the display 28 and an annotation positioner (AP) 83. The elements of the list 80 contain information for each annotation displayed on the display, such as each annotation's display position and the dimensions of its rectangular bounding box. The AP 83 is capable of displaying all of the text blocks in the list on the display, and given an additional text block it computes its display position so that it does not overlap the other text blocks in the list. The AP 83 can write directly to the display buffer 72 or via the operating system 74 or via the window management system 58. In the preferred embodiment the AP 83 displays the text blocks via a window management system 58. Among other functions, the window management system converts text and graphic objects such as lines and pixmaps to patterns of pixels to be stored in the display buffer 72 and displayed on the display 28. Examples of operating systems include AIX®, OS/2® and DOS. Examples of window management systems are the X Window System® for AIX, Presentation Manager® for OS/2 and Windows™ for DOS. The AP 83 software system is a collection of functions. These functions are explained in detail below.

Other elements shown in memory 38 include drivers 76 that interpret the electrical signals generated by devices such as the keyboard and mouse. A working memory area 78 is also shown in memory 38. The working memory area 78 can be utilized by any of the elements shown in memory 38. The working memory area can be utilized by the AP 83, window management system 58, the operating system 74 and other functions. The working memory area 78 may be partitioned amongst software systems and within software systems. The working memory area 78 may be utilized for communication, buffering, temporary storage or storage of data while a software system or function is running.

List of Annotations

Figure 2:
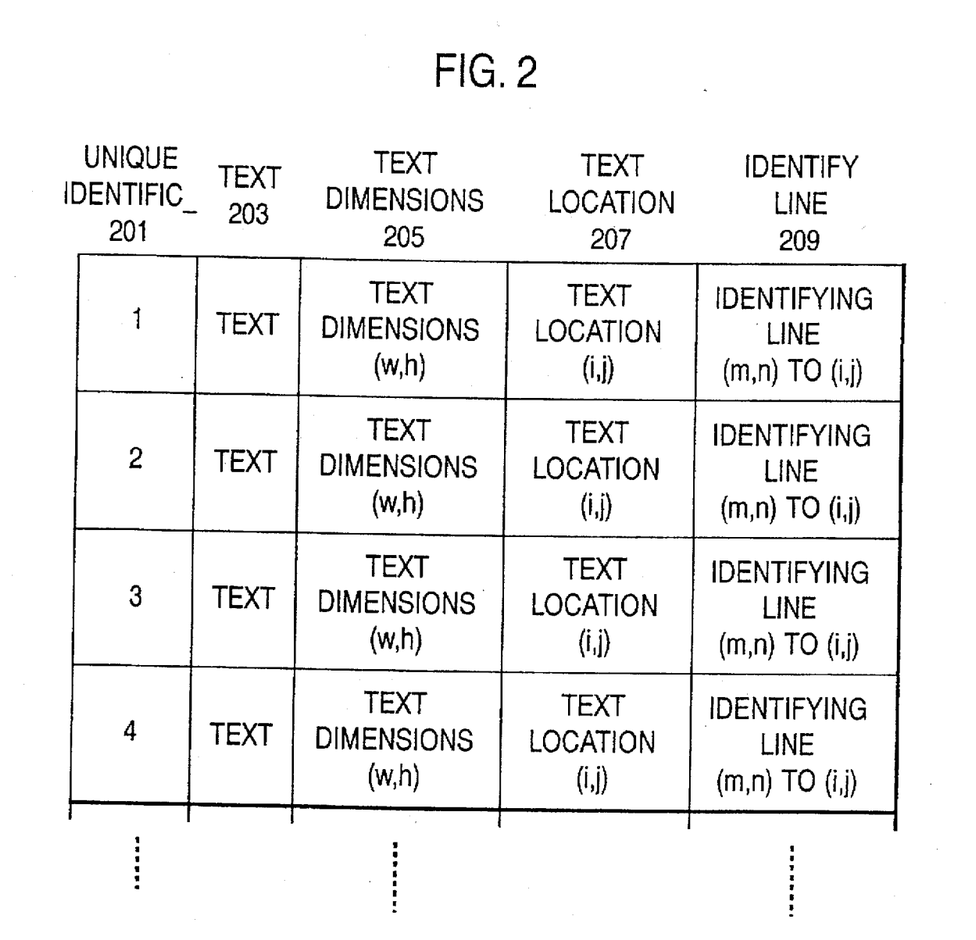
FIG. 2 is an illustrative diagram of the list of text blocks that have been placed on the display.

As stated previously, the text blocks that already have been positioned on the display are stored in a list. FIG. 2 demonstrates the preferred embodiment of the list which consists of the following: a unique identifier 201, text 203, text dimensions 205, text location 207, identifying line 209. The rectangle, which represents the rectangular bounding box of the text (i.e., the smallest rectangle that completely encloses the text) is specified by its position (i.e., text location 207) and its dimensions (i.e. text dimensions 205). The text position 207 can be specified by an integer grid point (i, j) that specifies the display position of the center of the rectangle. The dimensions can be specified by a pair of integers (w, h) that specify the width and height (in pixels) of the rectangle. Note that other embodiments of the list are possible; for instance, specifying the endpoints of the diagonal of the rectangle or one endpoint and the length and width. All that is required by the present invention is that the display size and display position of the annotations be determinable from the information contained in the list. As shown the list contains a unique identifier 201, text 203, text dimensions 205, text location 207, identifying line 209. All that is needed for the present invention is the text dimensions 205, text location 207 and identifying line 209. The other fields are presented for convenience. Instead of containing the actual information the list might contain pointers to the actual information for any of these items or any subset. It should be noted that FIG. 2 represents a logical view that the physical representation may consist of various representations and data structures such as an array or linked list or tree. The list may be stored in a file or a relational or object oriented database. It should also be noted that more than one annotation may be associated with each display object. Thus a display object may have zero, one or multiple annotations.

The identifying line 209 is specified by the integer grid point (m, n) of the display position of the object to be annotated. In the preferred embodiment a line will be drawn on the display between this point and the center of the rectangular bounding box. The line is not required to be drawn to the center of the bounding box and may be drawn to any point on, outside, or inside the box and may connect with any point inside outside or on the display object. The purpose of the line, arrow or symbol is to associate the information contained in the rectangular bounding box (i.e., text) and the display object. The result will appear as a block of text with a line or arrow or other symbol pointing to the display object being annotated (i.e., an airplane icon, a star, or some other icon or graphical object, depending on the particular application).

Annotation Positioner (AP)

As stated previously, the AP 83 is a collection of functions that position annotations of various sizes on a display without overlap. The AP 83 may position text blocks in a window, viewport or entire display area depending on the needs of any particular application. The functions of the AP 83 will now be described in detail with respect to annotations comprised of text blocks with a line connecting the text block and the associated display object. The AP 83 positions an additional text block so that it does not overlap text blocks that already have been placed on the display. The newly positioned text block is then added to the list of positioned text blocks. The AP 83 may also display a list of text blocks whose display positions already have been determined or may display the annotations when added to the list 80. In accordance with the present invention it is not necessary for the AP 83 to display the text blocks and associated lines as stored in the list. The AP 83 or an application may display the annotations. The AP 83 or Application may use a window management system, operating system or write directly to the display buffer to cause the text blocks to be displayed. An overview of window management system is provided below.

Given a list of text blocks that already have been positioned on the display without overlap, and given a new or additional annotation to position on the display and the display position of the display object to be annotated, the AP 83 determines the display location of the additional annotation. The AP must have as a minimum the size of the rectangle for the annotation and the location of the display object to be annotated. The additional annotation 85 and display object position 87 may point to these items or it may be capable of determining the items from information given. For instance, the size of the text block can be determined from knowing the number of lines, the number of characters per line and the font or fonts. The text itself is not required in order to determine the size of the bounding box but is required in order for the AP to display the text. This applies equally well if the annotation consist of something other then text such as icons, pixmaps and graphical structures. Thus, for instance, knowing the height and width in pixels of the pixmap. All that is required for the AP is that the additional annotation contain information that can be used to determine the size of the bounding box and the position of the display object to be annotated.

Figure 3A:
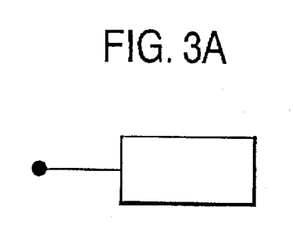
FIGS. 3A to 3D are graphical illustrations of the search for a display position at which to place an additional text block.
Figure 3B:
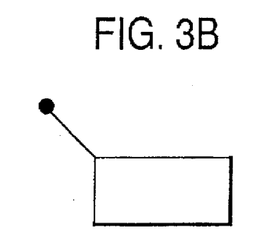
Figure 3C:
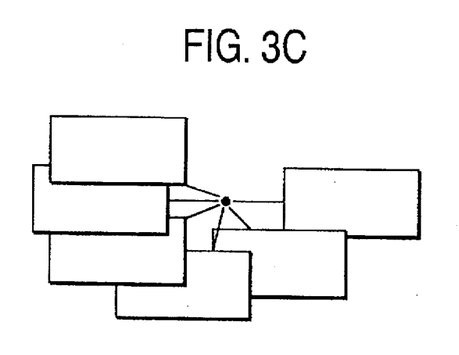
Figure 3D:
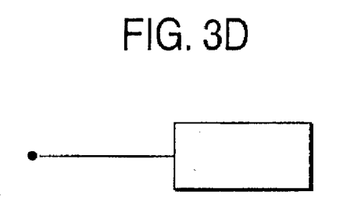
Figure 4:
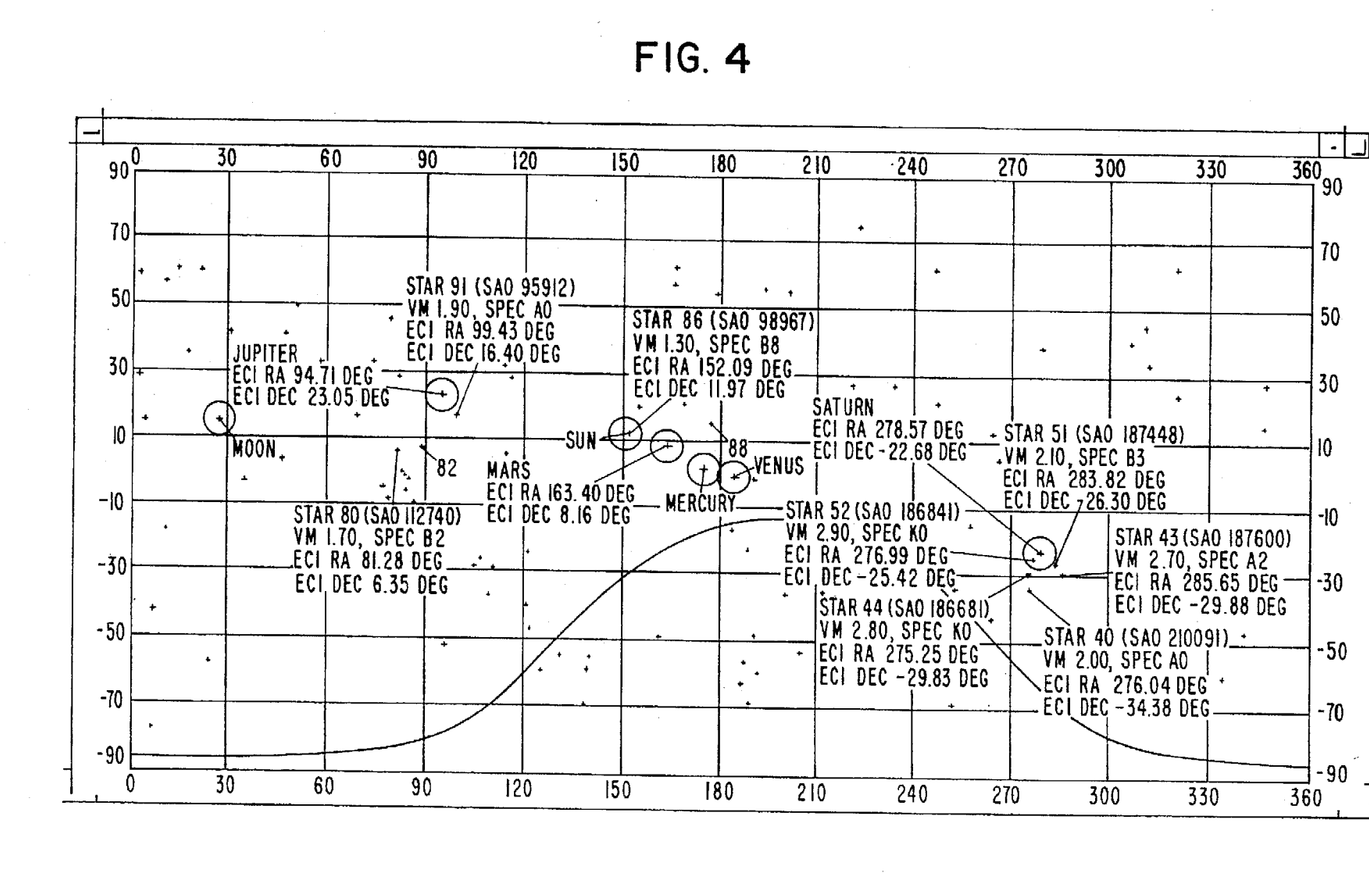
FIG. 4 is a pictorial example of text blocks of various sizes that have been placed on the display without overlap.

Proceeding now with the example, where the additional annotation consists of the identifying text and the dimensions of the rectangular bounding box of the text, the AP 83 determines the display location of the additional text block as follows. A small line length is selected for the length of the identifying arrow, and the position of the text block is tentatively placed at the 3 o'clock position as shown in FIG. 3A. Note that any initial line length and any initial angular orientation may be selected for the initial starting position. If there is no overlap with the other text blocks, the additional text block can be added to the list and displayed. Otherwise, the additional text block is tentatively placed at the 4 o'clock position as shown in FIG. 3B. Note that this example uses an angle increment of thirty degrees but a larger or smaller angle increment may also be used. This process is repeated (FIG. 3C) until a position for the additional text block is found. If a position that yields no overlap cannot be found, the length of the identifying arrow is increased, and the process is repeated as shown in FIG. 3D. Any suitable length increment may be used with the present invention. An example of text blocks positioned on the display of a star map application is shown in FIG. 4.

Figure 5:
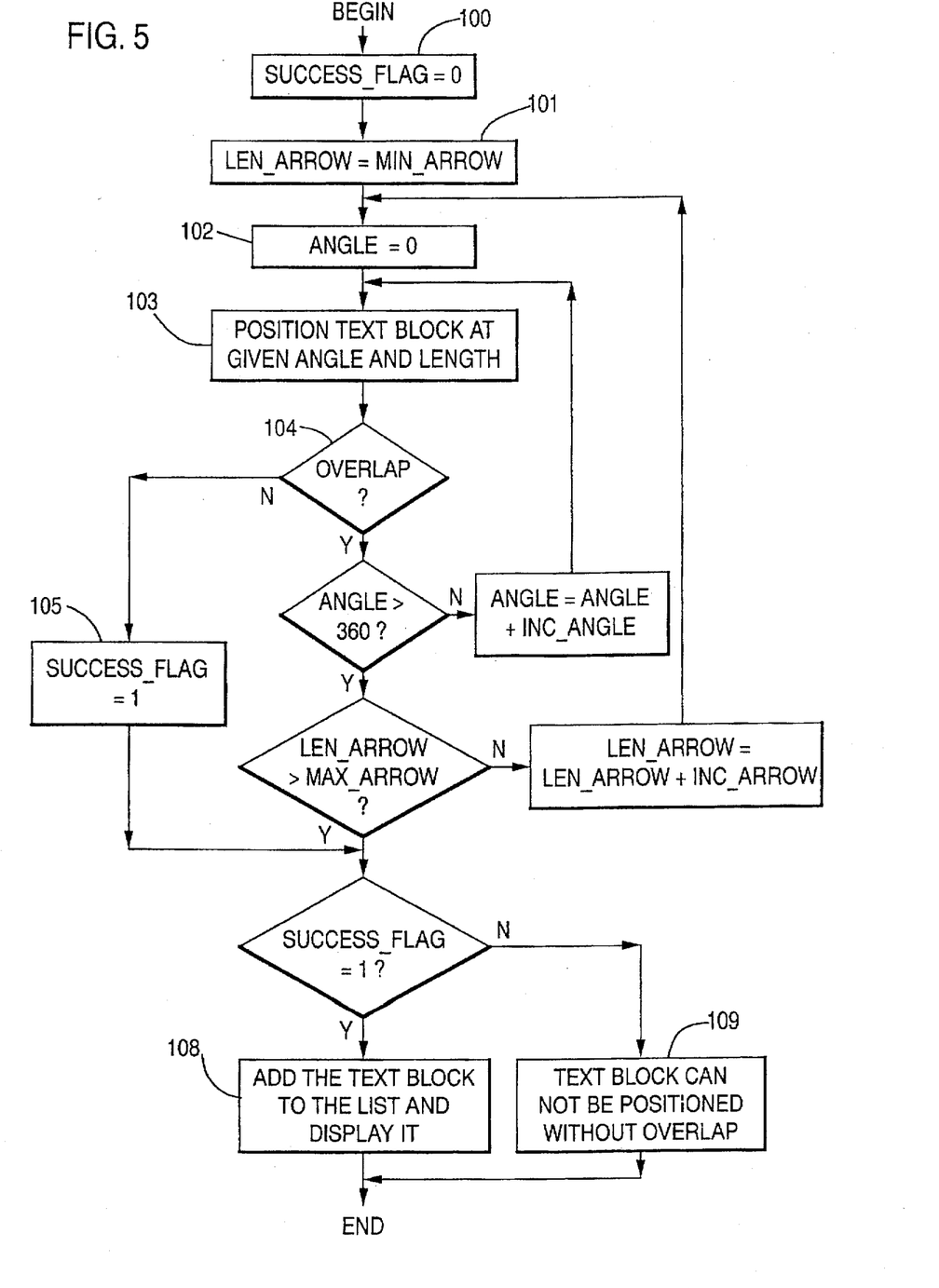
FIG. 5 is a flow diagram showing one embodiment of the present invention.

An embodiment of the present invention is given as the flow diagram of FIG. 5. A pseudocode listing is given in Table I along with the line numbers that are keyed to the blocks of the flow diagram of FIG. 5. A description is provided below with reference to the pseudocode of Table I. The embodiment consists primarily of two nested loops. The outer loop (101, 107) iterates over the length of the identifying line that joins an object to its identifying text. The inner loop (102, 106) iterates over the clock angle. The parameter MIN_ARROW specifies the starting length of the identifying line, while MAX_ARROW specifies the maximum length. The parameter INC_ARROW specifies the incremental value between iterations of the outer loop or the distance increment, while INC_ANGLE specifies the incremental value (in angular degrees) between iterations of the inner loop or the angle increment. The variable SUCCESS_FLAG is set if a position is found at which the additional block does not overlap the other text blocks.

TABLE I

Pseudocode for Text Positioner

| | |
|---|---|
| 100 | Let SUCCESS_FLAG = 0 |
| 101 | Do LEN_ARROW = MIN_ARROW to MAX_ARROW step INC_ARROW |
| 102 | Do ANGLE = 0 to 360 step INC_ANGLE |
| 103 | Define the position of the text block so that the length of the identifying line is LEN_ARROW and so that the identifying line forms and angle of ANGLE degrees with the horizontal. |
| 104 | Call the geometric subroutines that test for overlap. |
| 105 | IF there is no overlap, THEN let SUCCESS_FLAG= 1 and break out of both loops. |
| 106 | End do |
| 107 | End do |
| 108 | IF SUCCESS_FLAG = 1 THEN add the new text block to the list and display it. |
| 109 | ELSE the text block cannot be positioned without overlap. |

If no space could be found for the additional text block without overlap, the whole process can be repeated with much smaller values for the increment values of the line length (INC_ARROW) and angle (INC_ANGLE). This attempts to "squeeze" the text block between the existing text blocks. If this also fails, then the position that yielded the minimum amount of overlap can be selected.

To avoid the crowding of text blocks, all angular positions for a fixed line length can be tested. That is, every loop iteration of the inner loop can be executed. The position that yields the farthest distance from the previously placed text blocks can then be selected as the position for the additional text block.

The AP 83 includes functions that determine whether or not two text blocks overlap on the display. This determination is accomplished by simple geometric operations that determine whether or not two rectangles overlap, an identifying line crosses a rectangle, or two identifying lines cross one another.

Figure 7:
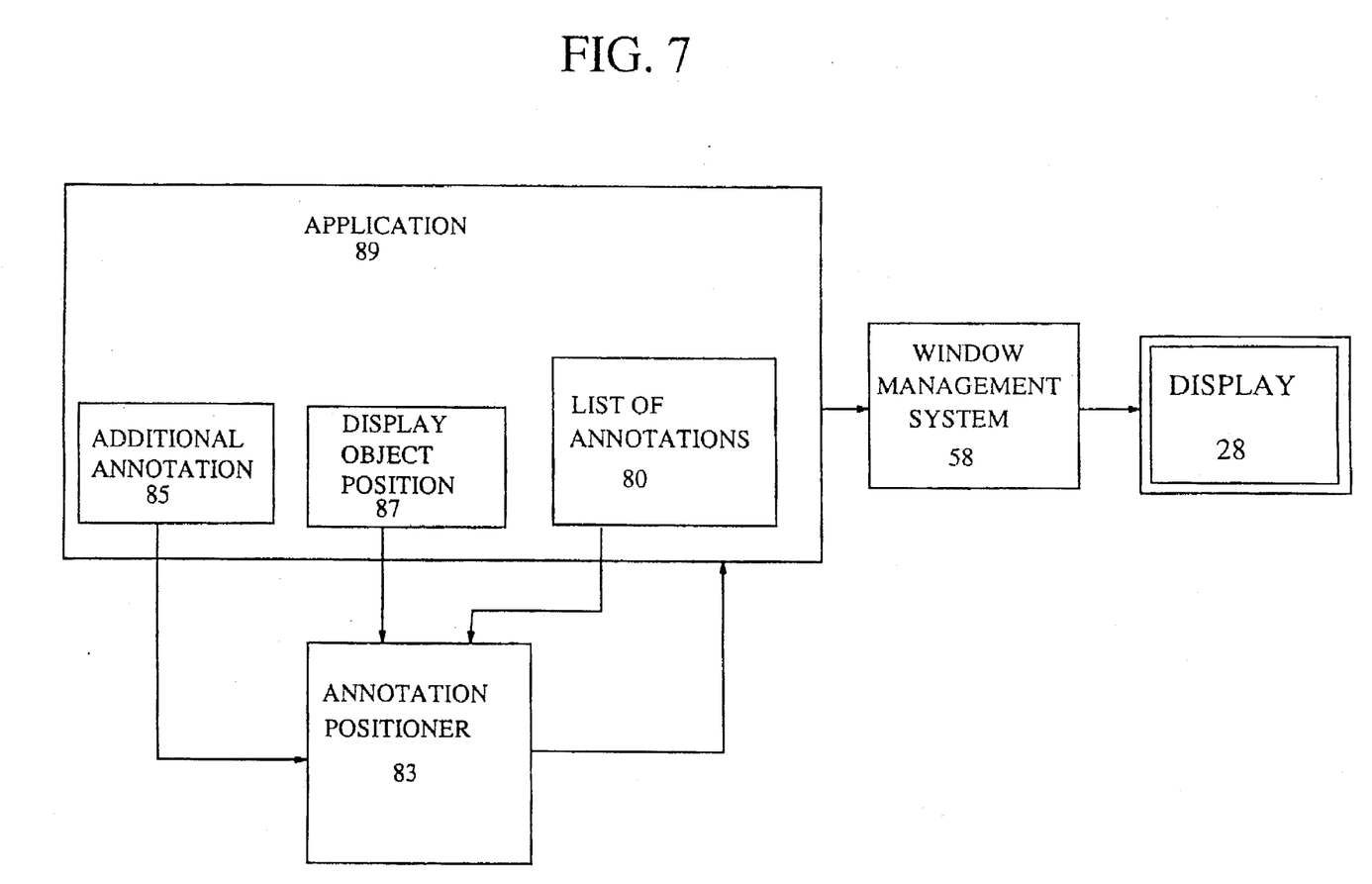
FIG. 7 shows a functional overview of an alternative embodiment where the present invention is utilized by an application.

The Application 89 may invoke the AP 83 in response to the user selecting a display object with an input device such as a mouse or keyboard. The Application 89 may also invoke the AP 83 because the position of one or more of the display objects have changed on the display. This is particularly the case where dynamic objects are represented on the display such as airplanes on an air traffic control display. When display object's positions change, the application might remove the associated annotation from the list of displayed annotations 80 and call the AP 83. The AP 83 would then

TABLE III

Pseudocode for Line Overlap

| | |
|---|---|
| 300 | (* Function LINE_OVERLAP *) <br> (* This function determines if two line segments *) <br> (* intersect. The function calculates the point of *) <br> (* intersection, and then determines if this point *) <br> (* lines on the line segments. *) |
| 301 | Let (a1,b1) and (c1,d1) be the endpoints of the first line segment |
| 302 | Let (a2,b2) and (c2,d2) be the endpoints of the second line segment. |
| 303 | If the lines are parallel, return FALSE. (* no intersection *) |
| 304 | Let (x,y) be the point of intersection of these two lines. (Compute this point by means of the standard algebraic equations.) |
| 305 | If x is between a1 and c1 and between a2 and c2, and y is between b1 and d1 and between b2 and d2, <br> then return TRUE. (* the lines intersect *) |
| 306 | Else return FALSE. (* no intersection *) |

TABLE II

Rectangle Overlap PseudoCode

| | |
|---|---|
| 250 | (* Function RECT_OVERLAP: *) <br> (* This function determines if two rectangles overlap. *) <br> (* It returns the value TRUE if they overlap, and FALSE *) <br> (* if they do not. |
| 251 | Let (x1,y1) be the center of the first rectangle, and let w1 be the width and h1 the height. |
| 252 | Let (x2,y2) be the center of the second rectangle, and let w2 be the width and h2 the height. |
| 253 | Let w = (w1 + w2)/2 and let h = (h1 + h2)/2. |
| 254 | If the difference between x1 and x2 is less than w, and if the difference between y1 and y2 is less than h, then return TRUE. (* the rectangles overlap *) |
| 255 | Else return FALSE. (* the rectangles do not overlap *) |

The pseudocode for these functions are provided in Tables II, Table III, and Table IV. These functions and their equivalents are well known in the art.

Although the AP 83 software system can display the text blocks, it is not required by the present invention. An application 89 may utilize the present invention to determine the location of text blocks it requires to have placed. This is depicted in FIG. 7. For instance, an application 89 may call the AP 83 with a list of text blocks 80 (or more likely a pointer to the storage area containing the list) that have been currently placed on the display and an additional text block 85 that needs to be placed on the display. The application provides information concerning the additional text block(s) 85 (or a list of text blocks that need to be displayed) and the display object position(s) 85 associated with the additional text block(s). The AP 83 then determines the position of the additional text block(s) 85 and returns this information to the application 89. The AP 83 can be implemented to handle more than one text block, or the Application can call the AP with one text block at a time. Note that even if the AP is called with more than one text block at a time it determines the display positions of the text blocks one at a time.

determine a suitable position for the annotation and return the display position to the application 89. The application 89 would then update the list 80 and the display with the new annotation position on the display 28.

The application 89 or AP 83 may add the additional text blocks to the list 80. Either the application 89 or AP 83 may cause the text blocks to be displayed. The application 89 or AP 83 may use a window management system, operating system or write directly to the display buffer to cause the text blocks and associated lines to be displayed. The present invention also works when the annotations are OSF/Motif windows and/or widgets. Windows and widgets are displayed using standard OSF/Motif function calls. When a window or widget is to be displayed the size and position can be specified in the function call. The present invention thus can be used to determine the position of a window or widget so that it does not overlap certain other windows or widgets. The X Window System Programming and Applications with Xt OSF/Motif Edition by D. A. Young, hereby incorporated by reference describes the concepts of windows, widgets and display functions.

TABLE IV

Pseudocode for Rectangle Line Overlap

| | |
|---|---|
| 400 | (* Function RECT_LINE_OVERLAP *) <br> (* This function determines if a line segment intersects *) <br> (* a rectangle. The function does this by using function *) <br> (* LINE_OVERLAP to determine if the line segment crosses *) <br> (* any of the four sides of the rectangle. *) |
| 401 | Let L denote the line segment. |
| 402 | Let (x,y) be the center of the rectangle, and let w be the width and h the height. <br> (* Use function LINE_OVERLAP in the following four statements to determine if L intersects one of the four sides of the rectangle. |
| 403 | If L intersects the line segment defined by the points (x − w/2,y − h/2) and (x − w/2,y + h/2), then return TRUE. |

TABLE IV-continued

Pseudocode for Rectangle Line Overlap

| | |
|---|---|
| 404 | Else if L intersects the line segment defined by the points (x − w/2,y + h/2) and (x + w/2,y + h/2), then return TRUE. |
| 405 | Else if L intersects the line segment defined by the points (x + w/2,y + h/2) and (x + w/2,y − h/2), then return TRUE. |
| 406 | Else if L intersects the line segment defined by the points (x + w/2,y − h/2) and (x − w/2,y − h/2), then return TRUE. |
| 407 | Else return FALSE. (* no intersection *) |

Window Management System (WMS)

The following paragraphs will describe the Window Management System in more detail. A window management system provides many of the important features of modern user computer interfaces. A window management system allows multiple applications to interact with the user on a single computer display, and provides low level functions for the application to display data and collect input from the user. The window management system permits application programs to show results in different areas of the display, to resize the display areas in which those applications are executing, to pop-up and to pull-down menus. The window management system is a resource manager in much the same way that an operating system is a resource manager, only the types of resources differ. The window management system allocates the resources of display area to various applications that seek to use the display and then assists in managing these display areas so that the applications do not interfere with one another. The window management system also allocates the resources of interaction devices to applications that require a user input and then routes the flow of input information from the devices to the event queue of the appropriate application for which the input is destined.

Interactive technique toolkits, which are subroutine libraries of interaction techniques, are mechanisms for making a collection of techniques available for use by application programs. Interactive technique toolkits are available for specific windowing management systems. Basic elements of the toolkit can include menus, dialog boxes, scroll bars, file selection boxes and of which can be conveniently implemented in windows. Interactive technique toolkits are available for specific WMSs. Widely used toolkits include the Andrew Window Management Systems Toolkit, the Macintosh™ Toolkit, OSF/Motif and InterViews toolkits for use with the X Windows system. Also XRAY and CLUE. Several toolkits implement Open/Look on both X Windows and News, Presentation Manager™ and the Sun View Window Management Systems Toolkit.

The X Window System is an industry-standard system that allows programmers to develop graphical user interfaces. In the X Windows system interaction techniques are called "widgets". A typical set of widgets includes a dialog box, file selection box, alert box, help box, list box, message box, radio button bank, radio buttons, choice button bank, choice buttons, toggle button bank, toggle button, fixed menu, pop-up menu, text input, scroll bar and application window. Each of these widgets is normally implemented as a window. In the X Windows system subwindows may also be used. The source code implementation of each widget consists of one or more calls to the X server. Thus when a widget subroutine is executed it causes a sequence of calls or commands or requests to be sent to the X server or window management system. OSF/Motif is an interaction toolkit that works with X windows and is one of a number of similar widget sets available for X Windows.

The architecture of the X Window System is based on the client-server model. A single process, known as the X server, is responsible for all input and output devices. The server creates and manages all windows on the display, produces text and graphics, and handles input devices such as the keyboard and mouse. The server implementation is independent of any application but is hardware specific. In the typical X Windows environment the application is a client and uses the services of the X server via a network connection using an asynchronous byte stream protocol. Multiple clients can connect to the same server. The X server 60 hides the details of the device-dependent implementation of the server from the clients.

The AP 83 communicates with the window management system via the Window System Interface which is considered part of the window management system for purposes of describing the present invention. The window management system interface may consist of a set of library routines for interfacing with the window management system or a higher level interaction toolkit or both. In the preferred embodiment the AP utilizes OSF/Motif to interface with the X windows system.

The foregoing paragraphs have described the placement of text blocks. However, the only property of text blocks that is essential for the invention to work is their rectangular shape. Thus, the invention is able to place any graphical object that has a rectangular shape or that can be bounded by a rectangle. Examples of such graphical objects include icons, pixmaps, bitmaps, graphical symbols, geometric shapes, windows and widgets.

While the invention has been described in detail herein in accord with certain preferred embodiments thereof, modifications and changes therein may be effected by those skilled in the art. Accordingly, it is intended by the appended claims to cover all such modifications and changes as fall within the true spirit and scope of the invention.

What is claimed:

1. In a computer system having a plurality of dynamic objects displayed on a display, and having a list of variably-sized annotations currently displayed on the display where each annotation is associated with a display object, the real time method of determining where to position a dynamic object and its associated annotation on the display when displaying an additional annotation associated with a display object the position of which on the display is changing in real time without deleting or moving any previously displayed annotations comprising:

a) selecting a unique display position for the additional annotation based upon a specified, variable distance between the display position and the display object and a specified, variable angle formed by the intersection of a line extending horizontally from the display object and a line extending from the display position to the display object;

b) testing whether the selected display position for the additional annotation overlaps any annotation presently displayed by incrementing the angle by a pre-specified angle increment until all possible angles in a 360 degree range have been tested then incrementing the distance by a distance increment and re-incrementing the angle; if there is no overlap then adding the additional annotation to the list of annotations and displaying the additional annotation at the selected display position, or, if more than one non-overlapping position exists, choosing the display position farthest from the currently displayed annotations; if there is overlap returning to and repeating the selecting step to determine a new display position for testing until a non overlapping display position is found or all positions have been tested in which case the display position having the least overlap is selected and displayed; and c) providing animated, real time display repositioning responses to dynamic changes in the positions of displayed objects on the display resulting from incoming, constantly changing data by deleting those objects and their associated annotations, displaying those objects in their new positions on the display and treating the deleted annotations as additional annotations for purposes of finding new positions for their display by returning to the selecting step.

2. The method of claim 1 further comprising the step of: providing an indication that a non-overlapping display position could not be found for the additional annotation after all display positions have been checked.

3. The method of claim 1 wherein each annotation is a text block.

4. The method of claim 1 wherein the annotations are comprised of a text blocks each with a line connecting the text block to the associated display object.

5. The method of claim 1 wherein the annotations are comprised of a text blocks each with a line connecting the text block to the associated display object.

6. The method of claim 1 wherein the annotations are comprised of a pixmap each with a line connecting the pixmap to the associated display object.

7. The method of claim 1 wherein the annotations are comprised of a pixmap each with a line connecting the pixmap to the associated display object.

8. The method of claim 1 wherein the additional annotation is displayed in response to a user selecting the associated display object.

9. The method of claim 1 wherein the position of the additional annotation is changed and displayed in response to a change in the position of a display object caused by a user or by application software.

10. The method of claim 1 further comprising the step of:
c) reducing the distance and angle increments and repeating steps a) and b) if no non-overlapping position is found.

11. The method of claim 1 further comprising the step of:
c) adding to the list of variably-sized annotations for the additional annotation a unique identifier, text associated with that annotation, the dimension of the text for that annotation defined as the smallest size rectangle which completely encloses the text, the location of the text for that annotation expressed as an integer grid point specifying the display position of the center of the rectangle and an identifying line expressed as a starting point and an ending point which ending point is identical to the location of the text for that annotation.

12. A computer system including a processing means, a memory means, a display means, and input means interconnected by a system bus, a software system for the real time annotation of objects displayed on a display which is accomplished without deleting or moving any previously displayed annotations comprising:

a plurality of display objects positioned on the display;
a list of variably-sized annotations currently displayed on the display in the memory means, each annotation in the list associated with a display object;
an additional annotation in the memory means associated with a display object;
a display position determining means in the memory means for generating a unique display position for the additional annotation based upon a specified, variable distance between the display position and the display object and a specified, variable angle formed by the intersection of a line extending horizontally from the display object and a line extending from the display position to the display object;

an overlap detection means for determining whether the display position of the additional annotation overlaps any annotation presently displayed;

an annotation positioning means where the display position generated for the additional annotation is tested by the overlap detection means by varying the angle by a pre-specified angle increment until all possible angles in a 360 degree range have been tested then incrementing the distance by a distance increment and re-incrementing the angle, if there is no overlap then the additional annotation is added to the list of annotations and displayed at the display position or, if more than one non-overlapping position exists, choosing the display position farthest from the currently displayed annotations; if there is overlap then generating a new display position for testing using the display position determining means until a non overlapping display position is found or all positions have been tested in which case the display position having the least overlap is selected and displayed.

13. The computer system of claim 12 wherein the annotation positioning means provides an indication that a non-overlapping display position could not be found for the additional annotation after all display positions have been checked.

14. The computer system of claim 12 wherein said memory means includes a window management system and wherein the annotation positioning means uses said window management system to display the additional annotation.

15. The computer system of claim 12 wherein each annotations is comprised of a text block.

16. The computer system of claim 12 wherein each annotation is comprised of a text blocks and with a line connecting the text block to the associated display object.

17. The computer system of claim 12 wherein each annotation is comprised of a pixmap and with a line connecting the pixmap to the associated display object.

18. The computer system of claim 12 wherein each annotation is comprised of a widget.

19. The computer system of claim 12 wherein each annotation is comprised of a widget and a line connecting the widget and the associated display object.

20. The computer system of claim 12 wherein the additional annotation is displayed in response to a user selecting the associated display object using the input means.

21. The computer system of claim 12 wherein the annotation positioning means reduces the distance and angle increments and regenerates the display positions if no non-overlapping position is found.

22. The computer system of claim 12 wherein said list of variably-sized annotations includes a unique identifier for each annotation, text associated with each annotation, the dimension of the text for each annotation defined as the smallest size rectangle which completely encloses the text, the location of the text for each annotation expressed as an integer grid point specifying the display position of the center of the rectangle and an identifying line expressed as a starting point and an ending point which ending point is identical to the location of the text for that annotation.

* * * * *